United States Patent
Flemming et al.

(10) Patent No.: US 7,512,837 B1
(45) Date of Patent: Mar. 31, 2009

(54) SYSTEM AND METHOD FOR THE RECOVERY OF LOST CACHE CAPACITY DUE TO DEFECTIVE CORES IN A MULTI-CORE CHIP

(75) Inventors: Diane Flemming, Pflugerville, TX (US); Ghadier R. Gholami, Austin, TX (US); Octavian F. Herescu, Austin, TX (US); William A. Maron, Austin, TX (US); Mysore M. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/098,306

(22) Filed: Apr. 4, 2008

(51) Int. Cl.
*G06F 11/00* (2006.01)

(52) U.S. Cl. .............. 714/13; 714/10; 714/12; 711/3; 711/149; 711/153; 711/170

(58) Field of Classification Search .......... 714/10, 714/12, 13; 711/3, 149, 153, 170
See application file for complete search history.

(56) References Cited

U.S. PATENT DOCUMENTS

| | | | |
|---|---|---|---|
| 5,594,863 A | | 1/1997 | Stiles |
| 6,067,633 A | * | 5/2000 | Robbins et al. ............... 714/1 |
| 6,438,661 B1 | | 8/2002 | Beardsley et al. |
| 7,111,196 B2 | * | 9/2006 | Balazich et al. .............. 714/13 |
| 7,240,160 B1 | * | 7/2007 | Hetherington et al. ...... 711/122 |
| 7,415,630 B2 | * | 8/2008 | Hillman et al. ............... 714/11 |
| 2003/0074598 A1 | * | 4/2003 | Bossen et al. ................. 714/6 |
| 2006/0004942 A1 | * | 1/2006 | Hetherington et al. ........ 711/3 |
| 2006/0080572 A1 | | 4/2006 | Fong |
| 2006/0248312 A1 | * | 11/2006 | Barlow et al. ............... 712/35 |
| 2007/0073993 A1 | * | 3/2007 | Allen et al. ................ 711/170 |
| 2007/0156963 A1 | * | 7/2007 | Chen et al. ................. 711/130 |
| 2007/0260895 A1 | | 11/2007 | Aquilar, Jr. et al. |
| 2008/0059712 A1 | * | 3/2008 | Fedorova ................... 711/130 |
| 2008/0091974 A1 | * | 4/2008 | Nakashima ................. 714/10 |
| 2008/0147975 A1 | * | 6/2008 | Zimmer et al. ............. 711/120 |
| 2008/0235454 A1 | * | 9/2008 | Duron et al. ............... 711/128 |

\* cited by examiner

*Primary Examiner*—Joshua A Lohn
(74) *Attorney, Agent, or Firm*—Cahn & Samuels, LLP

(57) ABSTRACT

A method for recovering lost cache capacity in a multi core chip having at least one defective core including identifying the cores contained in the chip that are viable cores and identifying at least one core contained in the chip that is defective. The method also includes identifying the cache memory local to the defective core and determining a redistribution of the cache resources local to the at least one defective core among the viable cores. The method also features dividing the cache memory local to the at least one defective core according to the redistribution determination and determining the address information associated with the cache memory local to the at least one defective core. The method also features providing the address information associated with the cache memory associated with the defective core to at least one of the viable cores, facilitating the supplementation of the cache memory local to the viable cores with the cache memory associated with the defective core.

1 Claim, 3 Drawing Sheets

SYSTEM AND METHOD FOR THE RECOVERY OF LOST CACHE CAPACITY DUE TO DEFECTIVE CORES IN A MULTI-CORE CHIP

I. FIELD OF THE INVENTION

This invention relates to a system and method for recovering cache memory capacity in a multi core chip lost due to defective cores contained on the chip.

II. BACKGROUND OF THE INVENTION

The future of chip manufacturing involves creating denser and more complicated chip designs. The trend to maximize the performance of a chip has been to construct chips that incorporate more processing cores per chip. The manufacturing process for multi core chips is complex, and at least initially there is expected to be a fairly mediocre yield ratio of good or otherwise viable cores. The designers of future product families envision many cores per chip, each with their own cache hierarchy.

FIG. 1 illustrates a multi-core chip 100, having 4 processing cores 102, 104, 105 and 108, contained therein. Each processing core has 2 cache memory levels, L2 and L3 associated therewith. Thus Core 1 (102) has two levels of cache memory, L2 (112) and L3 (122) associated therewith as does Core 2 (104) has cache memory 114, and 124 associated therewith. Core 3 and Core 4 also each have a cache hierarchy associated therewith. Core 3 (105) has been determined to be a defective core and is garded out.

Typically, access to main memory involves populating the local cache with the data. The "local" cache is the cache associated with the processor with invoked the object's retrieval. Hardware hashing dictates where in the cache the data object will reside based on the local in mail memory of this object. Those hashing mechanisms don't involve which cache the data will be brought into because it is always assumed that the data will be placed in the local cache. Similarly, data that is migrated out of L2 cache, into L3, is not labeled with which L3 cache is should be stored in, because it is assumed that the data will always go into the local L3. These standards don't change regardless of whether or not the various caches are shared.

If anything on the processing core is found to be "bad" or otherwise defective during the firmware initialization the core will be "garded out" rendering the entire cache hierarchy for that defective core unusable. The "bad" hardware status can be something as simple as a single failed transistor or some other functional defect that will make the processing core fundamentally broken or unusable. During functional verification of a single chip it may be that out of 8 cores, 2 or 3 will be defective. Preferably those chips will not be discarded, but rather, placed in a machine in which the customer ordered a 4 way or 6 way machine.

The defective cores are simply not needed so the fact that they are garded out is of no concern. With continued reference to FIG. 1, Core 3 (105) is defective and is therefore garded out and is of no concern. The caching capabilities of the L2 (115) and L3 (125) are typically independent of the defective core and are not affected by the fact that the particular core they are attached to is defective. However, the caching capacity of the L2 (115) and L3 (125) local to a particular core is typically lost when that core is garded out as defective.

III. SUMMARY OF THE INVENTION

Disclosed are methods, systems and apparatus for recovering lost cache capacity in a multi core chip having at least one defective core including identifying the cores contained in the chip that are viable cores and identifying at least one core contained in the chip that is defective. The method also includes identifying the cache memory local to the defective core and determining a redistribution of the cache resources local to the at least one defective core among the viable cores. The method also features dividing the cache memory local to the at least one defective core according to the redistribution determination and determining the address information associated with the cache memory local to the at least one defective core. The method also features providing the address information associated with the cache memory associated with the defective core to at least one of the viable cores, facilitating the supplementation of the cache memory local to the viable cores with the cache memory associated with the defective core.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the method should become evident to a person of ordinary skill in the art.

IV. BRIEF DESCRIPTION OF THE DRAWINGS

In order to describe the manner in which the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

V. DETAILED DESCRIPTION

Various embodiments are discussed in detail below. While specific implementations of the disclosed technology are discussed, it should be understood that this is done for purposes of illustration. A person skilled in the relevant art will recognize that other components and configurations may be used without departing from the spirit and scope of the invention.

In order to recapture the caching capacity of a core which is found to be bad, it is necessary to implement a mechanism to make the disembodied remote cache, cache local to a defective, non serviceable core available to the viable remote cores.

Figure 1:
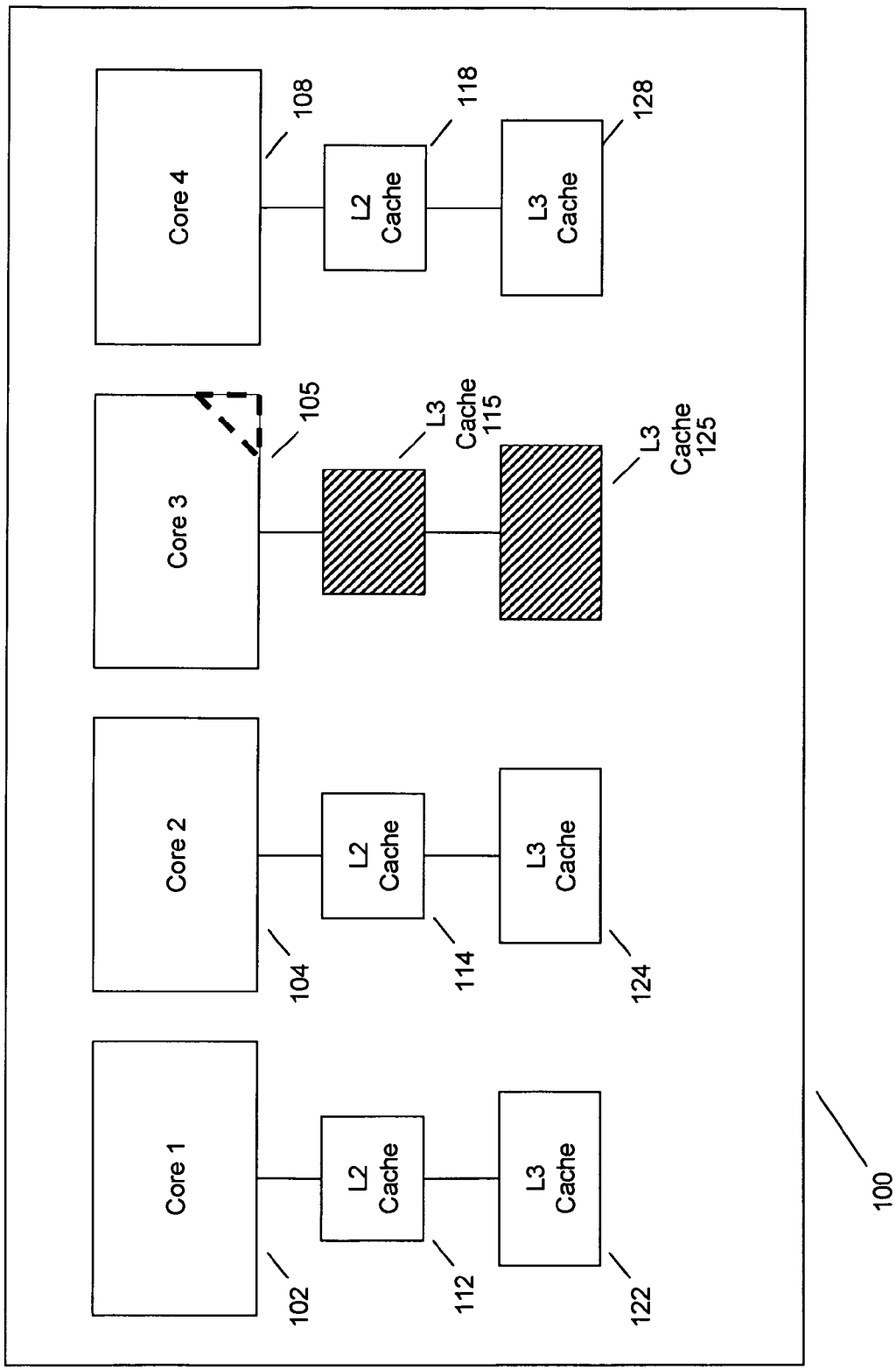
FIG. 1 illustrates an exemplarily block diagram of multi-core chip, showing viable and defective cores.
Figure 2:
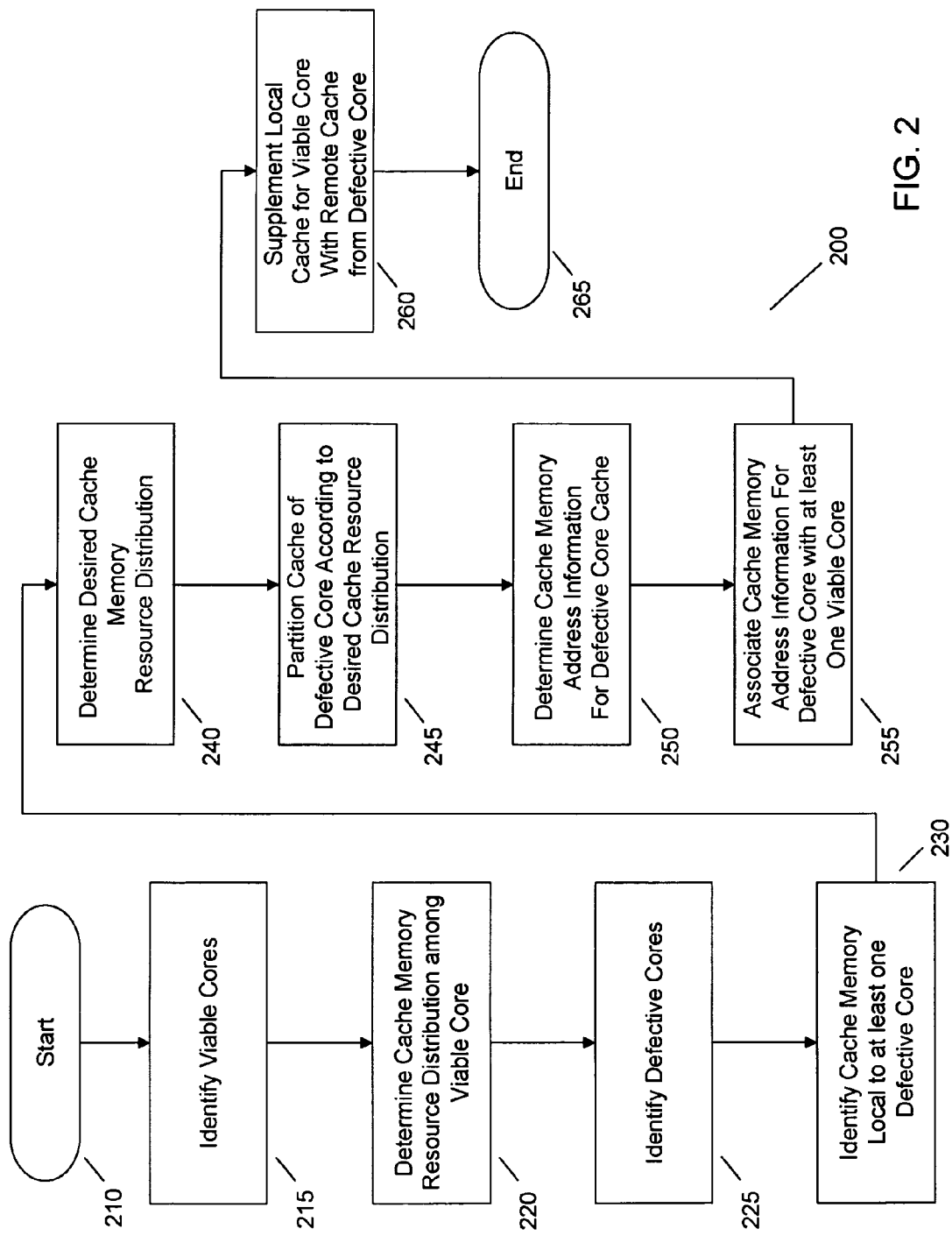
FIG. 2 illustrates an exemplarily flow chart for a method for recovering cache capacity lost due to a defective core in a multi core chip.

Referring to the Figures, wherein like elements are denoted by like find numbers, FIG. 2, shows an exemplarily flowchart 200 for recovering cache capacity lost due to a defective core in a multi core chip in accordance with the disclosed invention. Initially the system will evaluate the processing cores contained in the multi core chip and identify the cores contained in the chip that are viable cores 215. Once the system identifies the viable or otherwise serviceable cores the system determines the cache memory resource distribution among the viable cores 220. Specifically, the system determines the cache memory resources associated with each of the viable cores. The system also identifies any cores contained in the chip that are defective 225 and identifies any cache memory local or otherwise associated with the defective core 230.

When the cache memory resources of the chip have been evaluated, the system determines a desired cache memory resource distribution 240. Specifically, the system then determines the redistribution of the chip's cache resources local to the defective core among the viable cores. In a preferred embodiment the distribution of the recovered caching capacity is even among the L2 ad L3 cache memory associated with the viable cores contained on the chip. However a determination of how the recovered caching capacity can be partially or entirely based on a predetermined set of factors such as the most efficient use of the cache memory resources based on the chip's function or how a particular core on the chip is to be employed. Other factors may determine the memory resource distribution such as a core's physical location on the chip, thermal considerations or other considerations that may or may not be chip specific.

Based on the desired redistribution of cache resources from the defective core, the system divides or partitions the cache memory local to the at least one defective core according to the redistribution determination. The system then determines the address information associated with the cache memory local to the at least one defective core 250 and provides the address information associated with the cache memory associated with the defective core to at least one of the viable cores associating the cache memory for the defective core with at least one of the viable cores 255. The association of the defective core's local cache memory with the remote cache memory of at least one viable core, effectively supplements the cache memory local to the viable cores with the cache memory local to the defective core 260.

In yet another example embodiment the disclosed invention resides in a method for recovering lost cache capacity in a multi core chip having at least one defective core including identifying the cores contained in the chip that are viable cores and identifying at least one core contained in the chip that is defective. The method also includes identifying the cache memory local to the defective core and determining a redistribution of the cache resources local to the at least one defective core among the viable cores. The method also features dividing the cache memory local to the at least one defective core according to the redistribution determination and determining the address information associated with the cache memory local to the at least one defective core. The method also features providing the address information associated with the cache memory associated with the defective core to at least one of the viable cores, facilitating the supplementation of the cache memory local to the viable cores with the cache memory associated with the defective core.

Figure 3:
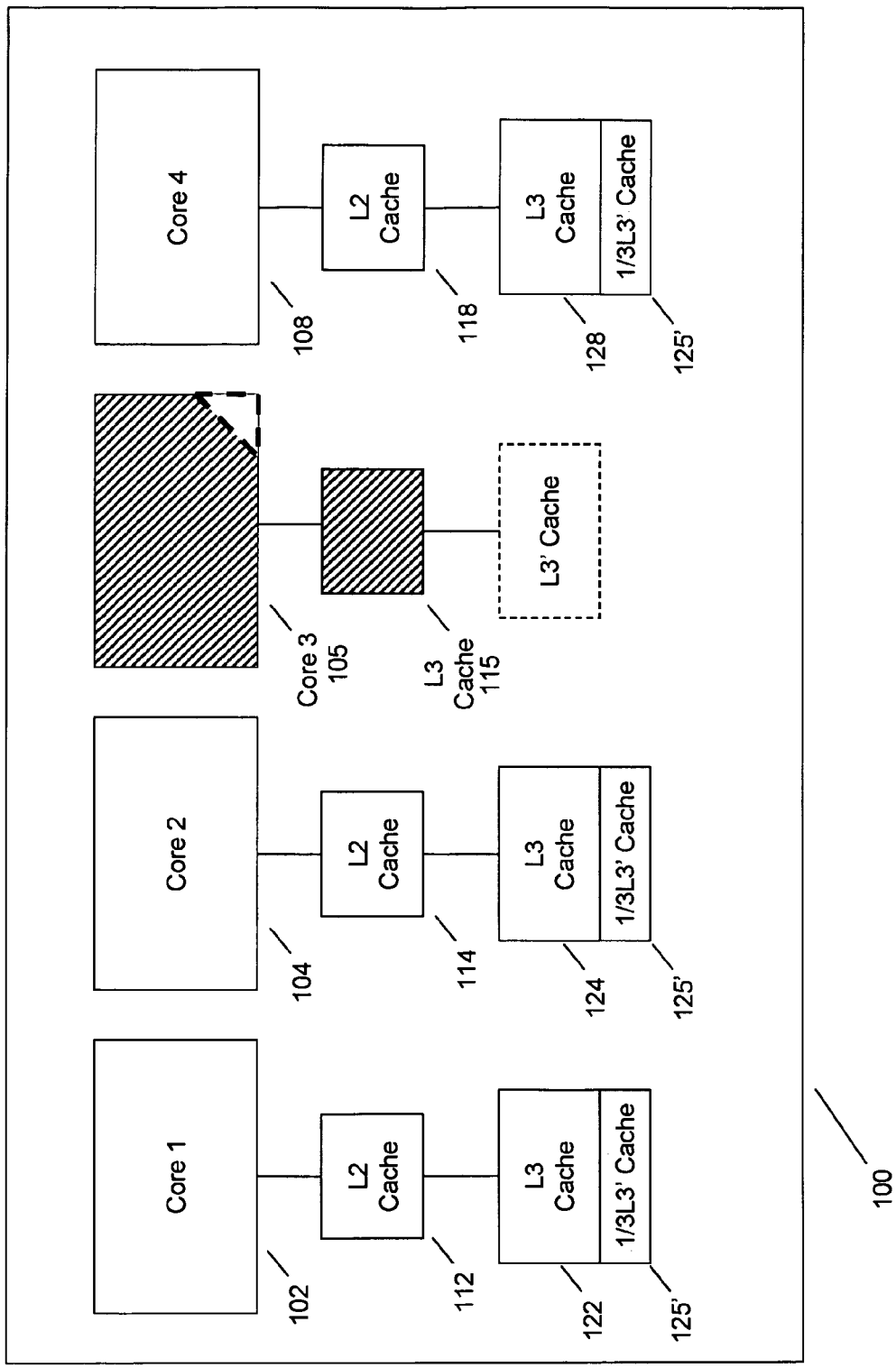
FIG. 3 illustrates an exemplarily block diagram of a multi-core chip, showing cache memory local to viable cores supplemented by cache memory local to a defective core.

Referring now to FIG. 3 and with continued reference to FIG. 2, FIG. 2 illustrates an exemplarily block diagram of a multi-core chip, showing cache memory local to viable cores supplemented by cache memory local to a defective core. Shown on the chip 100 are 4 processing cores 102, 104, 105 and 108, each having a cache memory hierarchy associated therewith. Each processing core has 2 cache memory levels, L2 and L3 associated therewith. Thus Core 1 (102) has two levels of cache memory, L2 (112) and L3 (122) associated therewith as does Core 2 (104) has cache memory 114, and 124 associated therewith. Core 3 and Core 4 also each have a cache hierarchy associated therewith. Core 3 (105) has been determined to be a defective core unserviceable and is garded out.

In an illustrative example assume that each L3 cache 122, 124, 125 and 128 is 32 MB. For a chip 100 with 4 cores one of which is defective 105, the L3 cache 125 associated with the defective core 105 may be divided up among the remaining 3 cores 102, 104, and 108. In this example the cache from 125 is distributed evenly among the L3 cache associated with the viable cores, however other resource distributions may be used. Firmware takes the addressing space of the L3 associated with Core 1 (122) and extends it by 32 MB/3 (125'). The firmware serves up addressing information to Core 1 for an L3 cache that is (local L3)+(remote L3/3) in size. This manipulation of the cache memories is transparent to operating system. The operating system need never know that the cache size is composed of local and remote space. Similarly, the L3 cache 124 associated with Core 2 is supplemented with the addition of remote cache L3/3 in size 125'. The L3 cache memory 128 associated with Core 4 (108), is also supplemented with remote cache L3/3 in size 125'.

In yet another example embodiment of the disclosed invention the identical algorithm is applied for the abandoned L2 cache (115), and the L2 caches 112, 114 and 118 are supplemented by L2 cache from the defective Core.

In yet another example embodiment the disclosed algorithm may be applied to both the abandoned L3 cache 125, supplementing the L3 caches 122, 124, and 128 associated with the viable cores 102, 104, and 108 with L3 125' from the defective core 105, and to the L2 cache 115 supplementing the L2 caches 112, 114 and 118 with the recovered caching capacity from the L2 cache 115 also associated with the defective core 105.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

In yet another example embodiment the disclosed invention resides in a computer program product comprising computer usable medium for recovering lost cache capacity in a multi core chip having at least one defective core including computer program code for identifying the cores contained in the chip that are viable cores and identifying at least one core contained in the chip that is defective. The computer program product also includes computer program code for identifying the cache memory local to the defective core and determining a redistribution of the cache resources local to the at least one defective core among the viable cores. The computer program product also features computer program code for dividing the cache memory local to the at least one defective core according to the redistribution determination and computer program code for determining the address information associated with the cache memory local to the at least one defective core. The computer program product also features computer program code for providing the address information associated with the cache memory associated with the defective core to at least one of the viable cores, facilitating the supplementation of the cache memory local to the viable cores with the cache memory associated with the defective core.

The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of at least one general purpose computer, special purpose computer(s), or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A method for recovering lost cache capacity in a multi core chip having at least one defective core comprising:
    identifying the cores contained in said chip that are viable cores;
    identifying at least one core contained in said chip that is defective;
    identifying the cache memory local to said defective core;
    determining the redistribution of said cache resources local to said at least one defective core among said viable cores;
    dividing said cache memory local to said at least one defective core according to said redistribution determination;
    determining the address information associated with the cache memory local to said at least one defective core;
    providing said address information associated with the cache memory associated with said defective core to at least one of said viable cores;
    supplementing the cache memory local to said viable cores with the cache memory associated with said defective core.

* * * * *